D. T. DAY.
PROCESS OF TREATING MINERAL OILS FOR INCREASING THE YIELD OF LIGHT GRAVITY OILS.
APPLICATION FILED MAY 3, 1913. RENEWED FEB. 23, 1917.
1,221,698.
Patented Apr. 3, 1917.
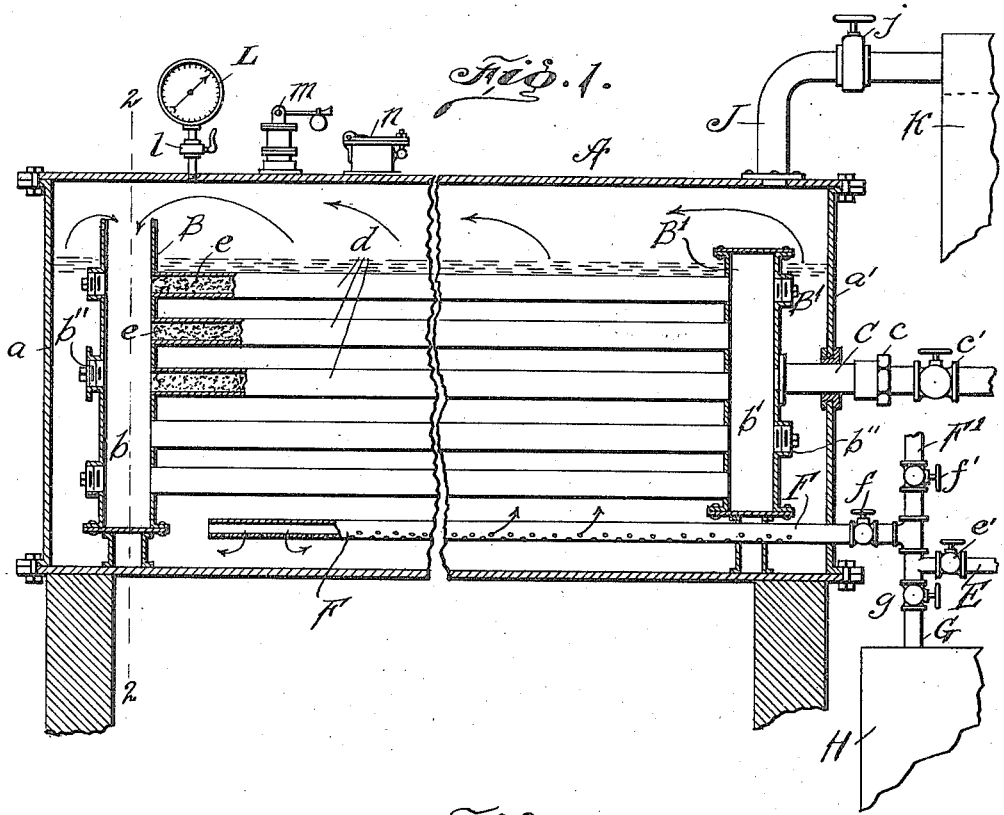
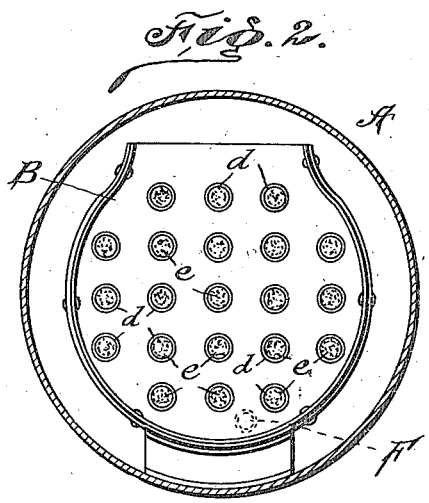
Witnesses
Inventor
David T. Day
E. B. Clark
By
Attorney

UNITED STATES PATENT OFFICE.

DAVID T. DAY, OF WASHINGTON, DISTRICT OF COLUMBIA.

PROCESS OF TREATING MINERAL OILS FOR INCREASING THE YIELD OF LIGHT-GRAVITY OILS.

1,221,698. Specification of Letters Patent. Patented Apr. 3, 1917.

Application filed May 3, 1913, Serial No. 765,372. Renewed February 23, 1917. Serial No. 150,618.

*To all whom it may concern:*

Be it known that I, DAVID T. DAY, a citizen of the United States, residing at Washington, District of Columbia, have invented certain new and useful Improvements in Processes of Treating Mineral Oils for Increasing the Yield of Light-Gravity Oils, of which the following is a specification.

This invention relates to a process of increasing the production or yield of light gravity oils, such as gasolene, from petroleum or distillates, by facilitating and increasing the cracking or splitting up of the heavier oils.

The object of my invention is to provide for facilitating and increasing the cracking operation,—that is the breaking up of heavier hydrocarbon oils into oils of lighter gravity, such as naphtha, benzin, or the light oil generally designated as gasolene, of good odor and quality. This is effected by adding sulfur or sulfur compounds or sulfur ores to the oils to be distilled before, or during the process of distillation. I have found that by adding sulfur or a sulfur compound to crude oils or distillates containing little or no sulfur, such oils can be more easily decomposed by heat under the proper pressure, with the production of an increased percentage of distillates lighter in specific gravity than those which would be produced by the ordinary process of simple distillation.

I preferably conduct the distilling operation in the presence of a substance containing hydrogen or hydrogen containing compounds—such as hydrogen carrying gas or vapor, and in the presence of a catalytic agent or porous contact substance, in accordance with the process described in my Patents, Nos. 826,089, July 17, 1906, and 1,004,632, October 3, 1911, I may add sulfur to the oil in the form of ammonium sulfid, sodium sulfid, iron sulfid or copper sulfid or in the form of sulfureted hydrogen.

The sulfur compounds referred to are those compounds of sulfur with hydrogen and carbon and with hydrogen and other elements which are comparatively easily broken up. This definition applies more for the sake of the applicability of these compounds to the process in this application, but does not apply to compounds such as sulfates. In connection with this process sulfur ores are the ordinary sulfur ores of commerce, particularly iron pyrites and cupiferous pyrites. Sulfids, but not sulfates, are to be regarded as available sulfur compounds within the meaning of the process in this application.

The matter constituting my invention will be defined in the claims.

I will now describe my process more in detail in connection with the accompanying drawings, illustrating one form of apparatus in which the process may be performed and in which—

Figure 1 represents a vertical longitudinal section of an oil still, with parts in elevation;

Fig. 2 represents a transverse section thereof on line 2—2, Fig. 1.

In the apparatus I provide a hydrogenator D in the oil still A. This still is provided at its ends with removable heads $a$, $a'$ which are secured by bolts in slots as shown, or by swing bolts in a well known manner. The hydrogenator D is made in the form of a manifold which can be removed or inserted in the cylinder A, as required. It is constructed with end heads B, B, each having a tube sheet connected by tubes $d$, and the heads having vapor chambers $b$, $b'$. The front chamber $b$ is open at the top for admitting oil vapor and the rear chamber $b'$ is closed except that it has a vapor outlet pipe C, provided with a coupler $c$ and a valve $c'$. Porous absorptive material $e$—contact substance—is placed in the tubes $d$. Screw plugs $b''$ are fitted in the outer plates of heads B'.

A perforated supply pipe F, for admitting oil and gas is placed near the bottom of the still and is provided with a valve $f$. An oil feed pipe F', having a valve $f$; also a hydrogen supply pipe G, having a valve $g$ connect with pipe F. A pipe E, having a valve $e'$ may connect with pipe G, as shown, or at other suitable place, for admitting sulfureted hydrogen gas to the oil in the still. Hydrogen or the well known water gas may be supplied hot from a generator H. The usual vapor outlet pipe J, having a valve $j$, may connect with the still and with a condenser K. I preferably apply to the top of the still a pressure gage L and valve $l$, a safety valve $m$, and a charging opening $n$, having a tight fitting cover, for admitting a solid sulfur compound or other material.

The contact material $e$ in the tubes $d$ may be iron by hydrogen, zinc dust, reduced nickel or cobalt, dry porous clays, spongy platinum, or palladium.

The operation may be conducted as follows:—Oil is supplied to the still through pipe F', filling the same to the dotted line $x$ and from one to fifteen per cent. of sulfur, or sulfur compound, or sulfur ore is added at the charging opening, $n$. Instead of adding sulfur in solid form I may admit sulfureted hydrogen by pipe E and pass it from pipe F in fine streams up through the body of oil at intervals during the distilling operation. The temperature is raised and the oil containing added sulfur is subjected to destructive distillation, or so called cracking by any of the well known processes. This splitting up of the heavier oils takes place at the ordinary pressure, but is accelerated by distilling under additional pressure; and in carrying out my process I raise the pressure to a degree between 50 and 100 pounds per square inch above atmospheric pressure.

I have found that the cracking operation is greatly aided by passing a hydrogen-carrying gas or vapor, such as hydrogen sulfid, ammonia, illuminating gas, or water gas, or steam—through the oil and thence passing the commingled oil vapors and hydrogen from the space above the oil into the space $b$ and thence through the porous absorptive contact material $e$ in the tubes $d$. A catalytic action here takes place, resulting in the hydrogen being combined with the previously unsaturated hydro-carbons, resulting in the production of oils having a lower specific gravity and lower boiling point. I wish it understood that the cracking operation in the first instance is much facilitated and increased by the added sulfur as above described, and that as a result I produce an increased percentage of oils having a lower specific gravity and a lower boiling point. Sulfur is added at different stages of the process, as may be necessary to maintain sulfur in the oil during distillation.

The hydrogenating tubes $d$ will be highly heated in the body of oil, and therefore, the oil vapors and hydrogen passing therethrough will be super-heated, which will facilitate the hydrogenating operation.

In order to regulate the temperature and maintain it at that degree most suitable for producing the cracking effect and for the hydrogenating operation, the valve $c'$ will be so set as to increase the pressure, and, consequently the temperature of the body of oil in the still. The pressure and temperature will thus be regulated for best effecting the cracking and the hydrogenating operations.

A stream of oil and hot hydrogen may be admitted simultaneously through pipes F' and G and discharged through pipes F up into the oil. Sulfureted hydrogen may be admitted at intervals as required through pipe E.

I wish it understood that the cracking operation, which is facilitated and increased by the addition of sulfur to crude oil or a distillate, and distillation under pressure at a comparatively high temperature,—between 250° C. and 350° C.,—is not dependent upon the coincident hydrogenating operation with a contact substance, as described in my previous above mentioned patents, but the latter process supplements the cracking operation, and the two operations may be conducted together or successively with highly beneficial results, and the production of largely increased percentages of light specific gravity oils, as naphtha, benzin, etc.

The oils issuing from the condenser connecting with the vapor pipe C of any still are rich in sulfur compounds especially sulfureted hydrogen which is recovered to a large extent for subsequent use by passing hydrogen, or a gas containing the same, through the oil. The hydrogen is blown through the oil for agitating the same and carrying off the sulfureted hydrogen. The resulting vapors or gases are again passed through the oil under treatment in the still for adding sulfur and hydrogen in the above described process. The oil may also be blown and agitated with air for eliminating the sulfur. The sulfureted hydrogen blown into the distillate oils serves to prevent oxidation of the oil by the sulfuric acid used in refining the same.

The sulfur remaining in the distillate is in such form as to be readily removable by the ordinary refining process with sulfuric acid, or by agitation with fullers' earth.

The oils obtained by this process are not only lower in boiling point than before, as the result of cracking, facilitated by the presence of added sulfur, but are highly saturated compounds, and particularly easily refined.

The contact agent may be placed in the tube $d$ by first removing the plugs $b''$ and then inserting the substance in the form of briquets. By removing the plugs at each end the substance may be pushed out with a rod. In practice there would preferably be a plug $b''$ in the plate opposite the end of each tube at each end of the manifold.

The vapor outlet pipe J with its valve $j$, and connecting with a condenser K, may be used when the vapors are not being passed off through pipe C. The cracking operation with added sulfur could thus be carried out under high heat and at a pressure between 50 and 100 pounds per square inch above atmospheric pressure, without using the hydrogenating operation.

As specific examples of the successful carrying out of this process, I would state the fact, that in September and October, 1913, as well as before and after that period, I placed 100 cubic centimeters of crude Mexican, California, Texas, and other petroleum, and residues from such petroleum in a retort of proportionate size, and first distilled off the distillate obtainable by the ordinary course of distillation, obtaining on the average 3% of distillate, distilling below 150° C., 20% of distillate distilling between 150° and 300° C., in the case of Mexican oil from well No. 4 of the Potrero del Llano district, Mexico, Province of Vera Cruz, and determined that the distillates, even the 3% of naphtha distilling below 150°, had particularly burnt and objectionable odor and would be characterized by more than fifty per cent. of unsaturated hydrocarbons.

I immediately, with another portion of the same crude oil, repeated the distillation with the addition of five to ten per cent. of sulfur, the different proportions being used in different experiments. The result was an increase up to from seven to ten per cent. in the yield of naphtha and up to thirty to thirty-five per cent. of burning oil, the distillate between 150° and 300° C., having a very marked improvement in the odor, as soon as the sulfureted hydrogen accompanying these distillates was removed by the addition of a dilute solution of soda.

Further, by the treatment of the first distillate obtained, without the addition of sulfur, with sulfuric acid it was impossible to obtain what would be called a water white oil; whereas the treatment of the distillate obtained with the use of sulfur was quite easily refined. Further, both samples were tested as to the contents of unsaturated hydrocarbons, and while it was found that the distillate between 150° and 300° C., by the ordinary process contained over fifty per cent. of unsaturated hydrocarbons (according to the method of treatment), by shaking for fifteen minutes with an equal volume of sulfuric acid of 1.84 gravity. This test when applied to the oil from the sulfur distillation, showed less than twenty per cent. of unsaturated hydrocarbons. These tests were repeated frequently and finally the tests were carried out on a larger scale in iron stills in the laboratory of an oil refining company with similar results, and the proportionate improvement being greater with the better facilities when using the iron retorts with the capacity of ten gallons.

Having described my invention, what I claim, and desire to secure by Letters Patent, is:—

1. In the treatment of mineral oils to increase the yield of light gravity oils, the process, which consists in adding sulfur or a sulfur compound to a heavy oil, such as gas oil or other distillate having a higher boiling point than gasolene, and subjecting such oil under a cracking temperature and at a pressure greater than the atmospheric pressure, to distillation, and adding sulfur at intervals during the distillation, whereby the cracking of the heavier oils is facilitated and increased, resulting in the production of an increased percentage of gasolene.

2. In the treatment of mineral oils to increase the yield of light gravity oils, the process, which consists in adding sulfur or sulfur compounds to a comparatively heavy hydrocarbon oil, subjecting the same to distillation at a cracking temperature and at a regulated pressure greater than the atmospheric pressure, for facilitating the cracking operation, mixing hydrogen carrying gas or vapor with the hot oil vapors of distillation in the still and passing the mixed vapors and gas through porous absorptive contact substances or a catalytic agent for improving the quality and increasing the percentage of light gravity oils.

3. In the treatment of mineral oil to increase the yield of light gravity oil, the process, which consists in adding sulfur to the oil, subjecting the same to distillation for facilitating the cracking operation, passing streams of hydrogen carrying gas or vapor up through the body of oil being distilled, superheating the resulting mixture of hydrogen and oil vapors under pressure in contact with porous absorptive substances and thereby causing hydrogen to combine with the unsaturated oil.

4. In the treatment of mineral oils, the process which consists of introducing sulfur compounds, especially sulfureted hydrogen into oil distillates for the purpose of preventing oxidation of the distillate by the sulfuric acid used in refining said distillate, and subsequently eliminating the sulfur by blowing and agitating with air or hydrogen.

In testimony whereof I affix my signature in presence of two witnesses.

DAVID T. DAY.

Witnesses:
ALTHA T. COONS,
JNO. D. MCCHESNEY.